United States Patent [19]
Bockelmann
[11] 3,727,863
[45] Apr. 17, 1973

[54] AIR-VENTING PARACHUTE

[75] Inventor: Victor G. Bockelmann, El Centro, Calif.
[73] Assignee: The United States of America as represented by the Secretary of the Navy

[22] Filed: June 23, 1971
[21] Appl. No.: 155,929

[52] U.S. Cl. ....244/145
[51] Int. Cl. ....B64d 17/12
[58] Field of Search ....244/145, 152, 138, 244/142

[56] References Cited

UNITED STATES PATENTS

| | | | |
|---|---|---|---|
| 1,784,774 | 12/1930 | Auorio | 244/145 |
| 2,409,562 | 10/1946 | Hastings | 244/145 |
| 1,931,160 | 10/1933 | Knight | 244/145 |
| 3,222,016 | 12/1965 | Boone | 244/145 |
| 3,350,040 | 10/1967 | Sims et al. | 244/145 |

*Primary Examiner*—Milton Buchler
*Assistant Examiner*—Carl A. Rutledge
*Attorney*—R. S. Sciascia et al.

[57] ABSTRACT

A parachute, particularly suitable for decelerating illuminating flare-type payloads, in which the canopy is constructed with an arrangement of high air permeable areas for venting the rising column of hot combustion gases from said flare and thereby slow the descent to increase flare performance.

9 Claims, 10 Drawing Figures 18 14 14 19 VIII 14 20 36 36 VIII 32 28 28 30 26

INVENTOR.
VICTOR G. BOCKELMANN
BY
George J. Rubens

*INVENTOR.*
VICTOR G. BOCKELMANN

BY
George J. Rubens

AIR-VENTING PARACHUTE

BACKGROUND OF THE INVENTION

The invention relates to parachutes designed primarily for deployment with illuminating projectiles, i.e., "Star Shells," but it is to be understood that it can be used for any purpose for which it is found applicable.

The use of parachutes for supporting illuminating flares delivered by "Star Shells" and other means of delivery in a well-established military maneuver. Operating performance of such illuminating projectiles has been limited primarily by the extent the parachute is able to maintain the flare in a suspended position over the intended target. Some of the factors which limit performance of such parachutes is an excess weight of the canopy, and a high rate of descent caused by instability, etc.

Prior art developments have constructed parachute canopies with various types of pockets and openings for other purposes, namely for steering or for relieving excess pressures experienced during initial opening of the parachute upon deployment.

SUMMARY OF THE INVENTION

Improved performance of illuminating-type projectiles is accomplished by uniquely designing the parachute canopy with uniformly disposed air permeable areas that dissipate the hot column of rising gases and ensure better parachute stability, lighter weight, and a slower rate of descent.

In a preferred embodiment the parachute in a plan view has a square shape with a downwardly depending skirt around the four sides. The vented areas are preferably configured in a cross extending along the horizontal and vertical centerlines of the canopy. The vented areas may be fabricated of a netting material that extends along the top of the canopy and downwardly along the skirt portion.

The inner and outer corners of the canopy are connected by shroud lines to the load, i.e., illuminating flare. Means are provided for releasably closing the vented areas to aid canopy inflation when initially deployed and for gradually opening the vented areas during deployment.

OBJECTS OF THE INVENTION

A principal object of the invention is to provide a parachute which will be more stable when used with an illuminating flare that produces a vertical column of rising hot gases.

Another important object is to reduce the weight of the parachute, and a corollary object is to reduce the rate of parachute descent.

Still another object is to provide a parachute canopy which will land on the ground in an extended flat condition making it suitable for use as a target.

Other objects, advantages and novel features of the invention will become apparent from the following detailed description of the invention when considered in conjunction with the accompanying drawings.

DESCRIPTION OF THE PREFERRED EMBODIMENT

Figure 2:
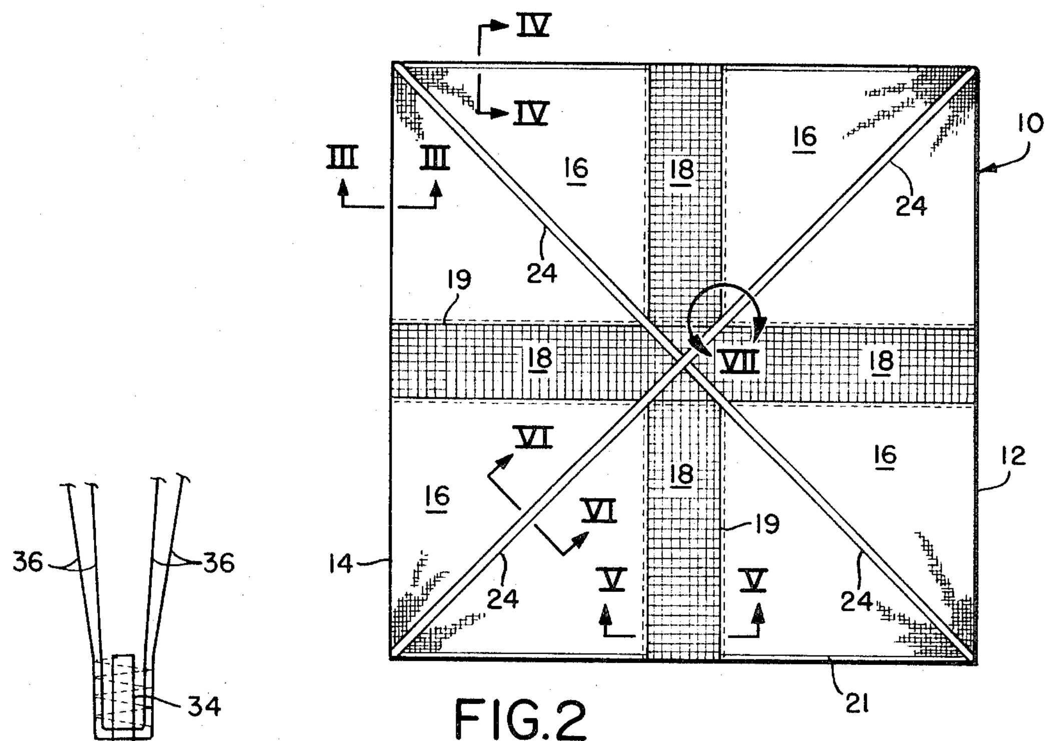
FIG. 2 is a top plan view of the canopy of FIG. 1.
Figure 1:
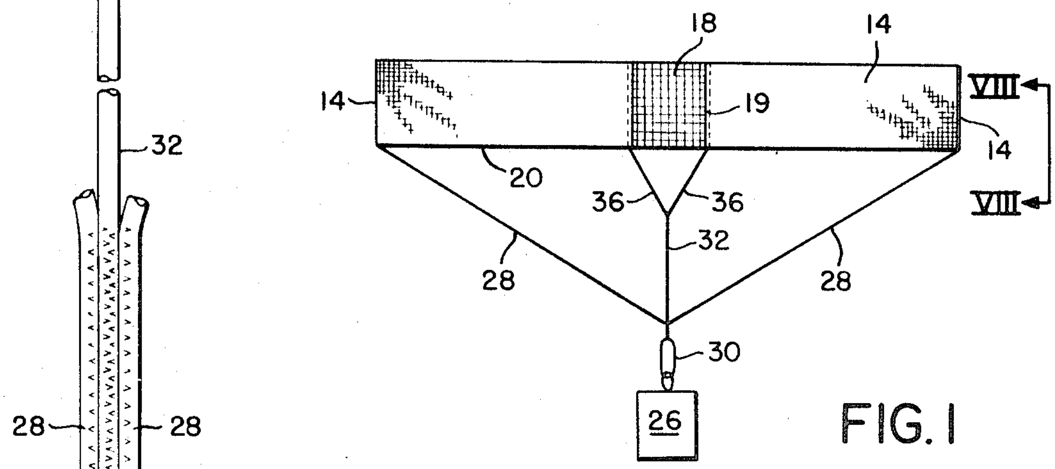
FIG. 1 is a side elevation of the novel parachute of this invention with the component parts shown in an extended but unloaded condition.
Figure 5:
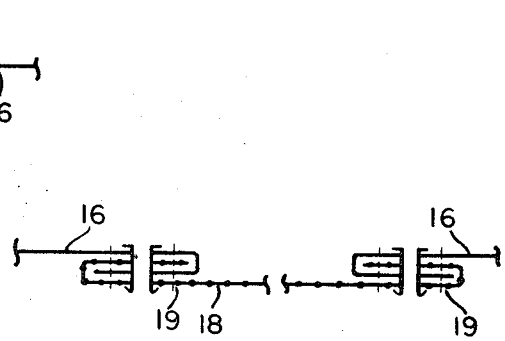
FIG. 5 is an enlarged cross-sectional view taken along line V—V of one of the permeable area strips of FIG. 2.

Referring to the drawings where like reference numerals pertain to the same parts throughout the figures, there is shown in FIGS. 1 and 2 the invention parachute 10 arranged in an extended and unloaded condition. Parachute 10 may be incorporated in a conventional "-Star Shell" projectile, not shown, or any other type of delivery means. Parachute canopy 12 is fabricated preferably of conventional cloth material in a square, flat shape with a downwardly depending skirt portion 14 extending around all four sides. The canopy 12 is bisected into four smaller square canopy panels 16 by a pair of narrow sections or strips 18 of netting material or any other material having a high air permeability arranged to intersect in a cross-configuration. The lateral edges of netting sections 18 are folded and sewn to the corresponding edges of canopy panels 16 as shown in FIG. 5, to form seams 19. Each strip section 18 extends entirely across the top of canopy 12 and downwardly along the skirt to hem 20, as clearly shown in FIGS. 1 and 2.

Figure 3:
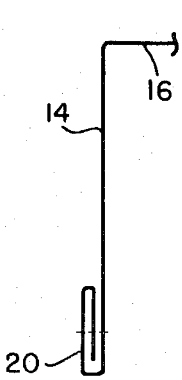
FIG. 3 is an enlarged cross-sectional view taken along line III—III of FIG. 2.
Figure 4:
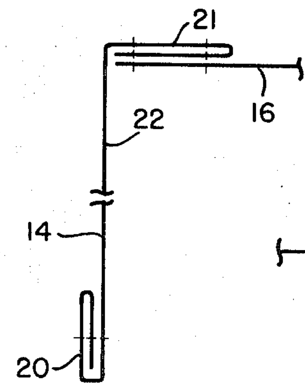
FIG. 4 is an enlarged cross-sectional view taken along line IV—IV of FIG. 2.

As shown in FIG. 3 the fabric of each canopy panel 16 extends continuously across the top and downwardly on one outer side to form the skirt portion 14 in an integral relation. On the adjacent outer side of each canopy panel 16, skirt portion 14 is formed by stitching at 21 a separate fabric panel 22 to the canopy portion 16, as shown in FIG. 4.

Figure 6:
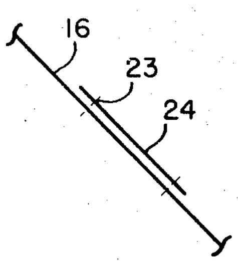
FIG. 6 is an enlarged cross-sectional view taken along line VI—VI of FIG. 2.

The four canopy squares 16 are additionally secured together by reinforcing tapes 24 stitched at 23 thereto as shown in FIG. 6. Tapes 24 extend in crossing relation at an angle 45° offset from strip sections 18 from each outer corner of canopy 12 diagonally across canopy panels 15 and down along skirt portion 14.

Figure 8:
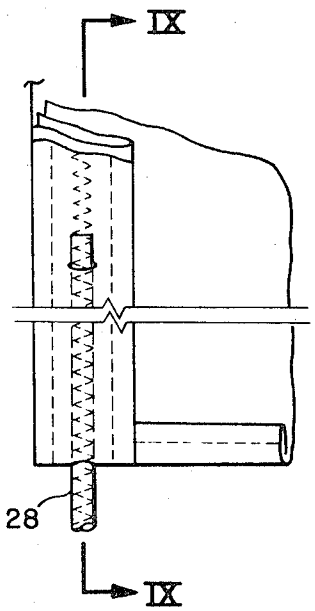
FIG. 8 is an enlarged elevation view of one of the outside corners of one of the canopy squares showing the manner of anchoring an end of its corresponding main suspension lines.
Figure 9:
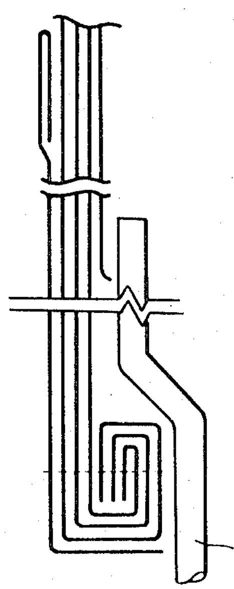
FIG. 9 is an enlarged cross-sectional view taken along line IX—IX of FIG. 8.

Two sets of suspension lines connect the canopy to a payload, such as an illuminating flare 26. One set includes four outer main suspension lines 28 having their upper ends anchored, such as by sewing, in each outer corner of the canopy squares, as shown in FIGS. 8 and 9. The lower ends of suspension lines 28 extend downwardly to a central confluence point and their bights integrally formed into a loop 30 from which is suspended flare 26.

Figure 10:
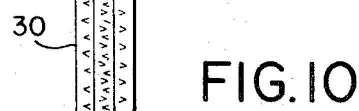
FIG. 10 is a plan view of the payload supporting loop formed by the center and main suspension lines with the respective lines extended in an opened condition to show the relationship.
Figure 7:
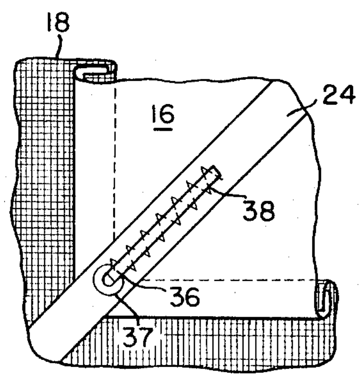
FIG. 7 is an enlarged top plan view of one of the inside corners of one of the canopy squares taken along line VII—VII of FIG. 2 showing the manner of anchoring an end of its corresponding center suspension lines.

A second set of suspension lines comprises a single centerline 32 having its lower end anchored by sewing to the bights of suspension lines 28 in loop 30 (FIG. 10). The upper end of centerline 32 is anchored by zigzag stitching 34 to four extension centerlines 36 (FIG. 10), the free ends of extensions 36 each passing through a grommet 37 and anchored by stitching 38, to a corresponding inner corner of each canopy panel 16 and reinforcing tape 24, as shown in FIG. 7.

One feature of the invention is designed to enhance the initial inflation of the novel parachute canopy by releasably closing netting sections 18. This can be accomplished by applying during the procedure of parachute packing, a masking tape, not shown, along the seams of each netting section 18. The masking tape is folded in half along its length with the adhesive sides exposed and placed between the two parallel seams 19 of each netting section 18 so that the U of the folded masking tape is away from the U of the folded netting section. A greater width of masking tape is used at the inner apex end of the netting section and a smaller width of tape is used at the skirt end so that the netting seams 19 tend to separate from the masking tape at the skirt end first and progressively separate in the direction of the canopy apex. It is obvious that other equivalent means for progressively opening netting sections 18 can be employed within the scope of this invention.

OPERATION

The operation of novel parachute 10 can best be described with reference to FIGS. 1 and 2. When the parachute is first ejected from the "Star Shell" projectile or other delivery vehicle its inflation is enhanced by the gradual opening of the air permeable netting sections 18 by the peeling off of the masking tape. At this stage of deployment, centerline 32 and extensions 36 support the suspended flare 26, leaving canopy panels 16 and suspension lines 28 unloaded and free to inflate.

As the parachute inflates, the suspended flare 26 becomes supported by outer suspension lines 28 and the centerlines become slack.

The design of the invention parachute achieves a substantial reduction in weight as compared to standard parachutes employed in "Star Shells," namely, a reduction from 2.9 pounds to 0.7 lbs. Another major advantage of this new canopy design over those of conventional parachutes is its ability to function in the column of hot combustion gases rising from the burning flare to maintain a stable condition and to achieve a lower rate of descent of the flare. The weight reduction of the canopy with its attendant reduction in volume, will allow for increased performances of the "Star Shell" either in greater range or increased burning time of the flare. The simplicity of design and construction achieves a significant cost reduction. The flat configuration of the canopy and the cross vented area, which can be colored in contrast to the canopy panels makes the parachute ideally suited for target designation purposes.

Obviously many modifications and variations of the present invention are possible in the light of the above teachings. It is therefore to be understood that within the scope of the appended claims the invention may be practiced otherwise than as specifically described.

What is claimed is:

1. In a parachute comprising:

a canopy;

suspension lines connecting the periphery of said canopy to a payload;

a centerline connecting the apex of said canopy to the payload said canopy having an area made of high air permeable material as compared to the air permeability of the remaining canopy material so as to be capable of venting a portion of air captured by the canopy;

said area of high area permeable material extending over a substantial dimension of, and uniformly disposed with respect to the apex of said canopy;

whereby during initial inflation the centerline supports the payload to enable the canopy and suspension lines to remain unloaded and free to assume a fully inflated position.

2. The parachute of claim 1 wherein said canopy has a flat top with vertical sides.

3. The parachute of claim 2 wherein said air permeable area is elongate strips of uniform width extending across the canopy in a cruciform configuration.

4. The parachute of claim 3 wherein means are provided for the releasable blocking of said air permeable strips, and the gradual opening of said strips commencing from the outer periphery inwardly to the canopy apex so that the rate of descent during initial inflation can be controlled.

5. The parachute of claim 1 wherein are provided a plurality of strips of said high permeable material arranged in a cruciform intersecting at the canopy apex.

6. A parachute for use with a flare-type payload that generates hot combustion gases comprising:

a canopy having a generally square peripheral configuration and having a flat to in a plan view when in an unloaded condition;

a plurality of strips of a high air permeable material when compared to the air permeability of the remaining canopy material extending over a substantial dimension of said canopy area area dissipating a portion of the column of hot combustion gases rising from the burning flare;

said strips being arranged in a crossing pattern uniformly about the canopy apex;

suspension lines connected to at least the outer corners of the canopy for supporting the flare;

whereby the rate of descent of said parachute can be controlled.

7. The parachute of claim 6 wherein means are provided for varying the air permeability of said strips.

8. The parachute of claim 6 wherein the canopy in an unloaded condition has a depending hem portion around the periphery thereof on each side thereof, said strips of high air permeable material extending completely across said canopy and extending downwardly across said hem portion.

9. The parachute of claim 6 wherein are provided two strips of said high air permeable material extending completely across said canopy in a cruciform arrangement to divide the canopy into four uniformly spaced canopy squares, and a centerline connected at one end to said suspension lines and at the other end connected to the innermost corners of said canopy squares for supporting the payload during initial deployment.

* * * * *